United States Patent Office 3,395,138
Patented July 30, 1968

3,395,138
MONOAZO PYRAZOLONE DYES OF LOW
WATER SOLUBILITY
Ruedi Altermatt, Tecknau, Basel-Land, Hermann Burkhard, Neu-Allschwil, Basel-Land, and Curt Mueller, Basel, Switzerland, assignors to Sandoz Ltd. (also known as Sandoz A.G.), Basel, Switzerland
No Drawing. Filed Sept. 22, 1965, Ser. No. 489,386
Claims priority, application Switzerland, Sept. 28, 1964, 12,588/64
5 Claims. (Cl. 260—163)

ABSTRACT OF THE DISCLOSURE

Metal-free relatively water-insoluble 1 - phenyl - 3-methyl-5-pyrazolone-4-azo-nitrobenzene dyes containing neither sulfonic acid nor carboxylic acid groups and wherein the phenyl is substituted in one of its m- and p-positions by a carbonylamino, a carboxylic acid ester amino or a sulfonic acid ester amino group are useful for padding or printing all synthetic or semi-synthetic hydrophobic organic fibers with very good fastness properties.

---

This invention relates to azo dyes which are of low solubility in water and contain no sulfonic acid or carboxylic acid groups and no metal atoms. These dyes correspond to the formula

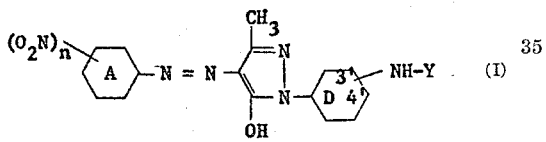
(I)

where the substituent —NH—Y of the nucleus D is in the 3' or 4' position;

Y is a member selected from a group of radicals consisting of —CO—$R_1$, —COO$R_2$ and —SO$_2$—$R_2$, where $R_1$ stands for hydrogen, trifluoromethyl, aryl, alkylaryl, cyanoaryl, alkoxyaryl, halogenaryl, nitroaryl and low molecular alkyl which may be substituted for example by cyano, trifluoromethyl, hydroxyl, alkoxy, aryl, aryloxy, amino, a carboxylic acid ester radical or a carboxylic acid amide radical of which alkoxy, aryl, aryloxy, amino, the carboxylic acid ester radical or carboxylic acid amide radical may be further substituted, e.g., by alkyl, cyano, halogen, low molecular alkoxy, nitro and halogenated alkyl and $R_2$ stands for aryl which may be further substituted e.g. by halogen atoms, low molecular alkyl and alkoxy, low molecular alkyl, which may be further substituted by halogen, aryl and alkoxy, $n$ Represents a whole number, either 1, 2 or 3 but preferably 1, and when the nucleus A and the nucleus D may be further substituted by substituents which are different from carboxylic acid and sulfonic acid groups.

The term "low-molecular-alkyl" or "low-molecular-alkoxy" means a radical consisting of 1 to 4, preferably 1 to 2 carbon atoms.

The process for the production consists of diazotizing 1 mole of an amine of formula

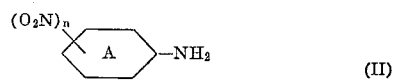
(II)

and coupling the diazo compound with 1 mole of a coupling component of formula

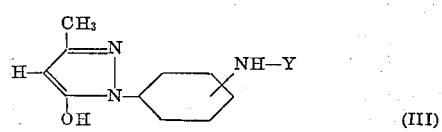
(III)

The nitroanilines used as diazo components may contain any of the substituents commonly used in the chemistry of disperse dyes, for example halogen, alkyl, alkoxy, trifluoromethyl, alkylsulfonyl, carboxylic acid amide or sulfonic acid amide radicals whose amide nitrogen may be monosubstituted or disubstituted. An exception to this rule is hydroxyl in the adjacent positions to the amino group. The following are enumerated as examples of amines of Formula II which can be used as diazo components:

1-amino-2-nitrobenzene, 1-amino-3-nitrobenzene,
1-amino-4-nitrobenzene, 1-amino-2,3-dinitrobenzene,
1-amino-2,4-dinitrobenzene, 1-amino-2,5-dinitrobenzene,
1-amino-2,6-dinitrobenzene, 1-amino-3,4-dinitrobenzene,
1-amino-3,5-dinitrobenzene, 1-amino-2-chloro-4-nitrobenzene,
1-amino-3-chloro-4-nitrobenzene, 1-amino-2-chloro-6-nitrobenzene,
1-amino-5-chloro-2-nitrobenzene, 1-amino-3-chloro-5-nitrobenzene,
1-amino-2-chloro-5-nitrobenzene, 1-amino-4-chloro-2-nitrobenzene, 1-amino-4-chloro-3-nitrobenzene, 1-amino-5-chloro-2,4-dinitrobenzene,
1-amino-6-chloro-2,4-dinitrobenzene, 1-amino-4-chloro-2,5-dinitrobenzene,
1-amino-6-chloro-2,5-dinitrobenzene, 1-amino-3-chloro-2,6-dinitrobenzene,
1-amino-4-chloro-2,6-dinitrobenzene, 1-amino-4-chloro-3,5-dinitrobenzene,
1-amino-6-bromo-2,4-dinitrobenzene, 1-amino-3,4-dichloro-2-nitrobenzene,
1-amino-3,5-dichloro-2-nitrobenzene, 1-amino-3,6-dichloro-2-nitrobenzene,
1-amino-4,5-dichloro-2-nitrobenzene, 1-amino-4,6-dichloro-2-nitrobenzene,
1-amino-5,6-dichloro-2-nitrobenzene, 1-amino-2,4-dichloro-3-nitrobenzene,
1-amino-2,5-dichloro-3-nitrobenzene, 1-amino-2,6-dichloro-3-nitrobenzene,
1-amino-4,6-dichloro-3-nitrobenzene, 1-amino-2,5-dichloro-4-nitrobenzene,
1-amino-2,6-dichloro-4-nitrobenzene, 1-amino-3,5-dichloro-4-nitrobenzene,
1-amino-4-bromo-2,3-dinitrobenzene, 1-amino-6-bromo-2,3-dinitrobenzene,
1-amino-5-bromo-2,4-dinitrobenzene, 1-amino-4-bromo-2,5-dinitrobenzene,
1-amino-4-bromo-2,6-dinitrobenzene, 1-amino-6-bromo-3,4-dinitrobenzene,
1-amino-2-bromo-3,5-ninitrobenzene, 1-amino-2,3-dichloro-4,6-dinitrobezene, 1 - amino-2,5-dichloro-3,4-dinitrobenzene,
1-amino-2-methyl-6-nitrobenzene, 1-amino-2-methyl-5-nitrobenzene,
1-amino-2-methyl-4-nitrobenzene, 1-amino-2-methyl-3-nitrobenzene,
1-amino-3-methyl-2-nitrobenzene, 1-amino-3-methyl-6-nitrobenzene,
1-amino-3-methyl-4-nitrobenzene, 1-amino-4-methyl-3-nitrobenzene,
1-amino-4-methyl-2-nitrobenzene, 1-amino-2,3-dimethyl-6-nitrobenzene,
1-amino-2,3-dimethyl-5-nitrobenzene, 1-amino-2,3-dimethyl-4-nitrobenzene,
1-amino-3,4-dimethyl-2-nitrobenzene, 1-amino-3,4-dimethyl-6-nitrobenzene,
1-amino-3,4-dimethyl-5-nitrobenzene, 1-amino-2,6-dimethyl-3-nitrobenzene,
1-amino-2,6-dimethyl-4-nitrobenzene, 1-amino-2,4-dimethyl-3-nitrobenzene,
1-amino-2,4-dimethyl-6-nitrobenzene, 1-amino-2,4-dimethyl-5-nitrobenzene,
1-amino-3,5-dimethyl-2-nitrobenzene, 1-amino-3,5-dimethyl-4-nitrobenzene,
1-amino-5,6-dinitro-2-methylbenzene, 1-amino-4,6-dinitro-2-methylbenzene,
1-amino-3,6-dinitro-2-methylbenzene, 1-amino-4,5-dinitro-2-methylbenzene,
1-amino-3,4-dinitro-2-methylbenzene, 1-amino-3,5-dinitro-2-methylbenzene,
1-amino-2,6-dinitro-3-methylbenzene, 1-amino-2,4-dinitro-3-methylbenzene,
1-amino-5,6-dinitro-3-methylbenzene, 1-amino-4,6-dinitro-3-methylbenzene,
1-amino-4,5-dinitro-3-methylbenzene, 1-amino-2,3-dinitro-4-methylbenzene,
1-amino-2,5-dinitro-4-methylbenzene, 1-amino-3,5-dinitro-4-methylbenzene,
1-amino-2,6-dinitro-4-methylbenzene, 1-amino-5-chloro-2-methyl-6-nitrobenzene, 1-amino-4-chloro-2-methyl-6-nitrobenzene,
1-amino-3-chloro-2-methyl-6-nitrobenzene, 1-amino-4-chloro-2-methyl-5-nitrobenzene, 1-amino-6-chloro-2-methyl-4-nitrobenzene,
1-amino-5-chloro-2-methyl-4-nitrobenzene, 1-amino-5-chloro-2-methyl-3-nitrobenzene, 1-amino-4-chloro-2-methyl-3-nitrobenzene,
1-amino-3-chloro-2-methyl-4-nitrobenzene, 1-amino-6-chloro-3-methyl-2-nitrobenzene, 1-amino-2-chloro-3-methyl-6-nitrobenzene,
1-amino-6-chloro-3-methyl-4-nitrobenzene, 1-amino-2-chloro-4-methyl-3-nitrobenzene, 1-amino-6-chloro-4-methyl-3-nitrobenzene,
1-amino-6-chloro-4-methyl-2-nitrobenzene, 1-amino-5-chloro-4-methyl-2-nitrobenzene, 1-amino-2,4-dichloro-3-methyl-6-nitrobenzene,
1-amino-2,5-dichloro-4-methyl-6-nitrobenzene,
1-amino-3-chloro-2,6-dinitro-4-methylbenzene,
1-amino-2-chloro-3,5-dinitro-4-methylbenzene,
1-amino-2,4-dibromo-6-methyl-3-nitrobenzene,
1-amino-2-bromo-4-nitrobenzene, 1-amino-4-bromo-2-nitrobenzene,
1-amino-2,4,6-trinitrobenzene, 1-amino-4-nitro-2-trifluoromethylbenzene, 1 - amino-2-nitro-4-trifluoromethylbenzene.
1-amino-2,6-dibromo-4-nitrobenzene, 1-amino-2-bromo-4-nitro-6-trifluoromethylbenzene, 1-amino-2-methylsulfonyl-4-nitrobenzene,
1-amino-4-methylsulfonyl-2-nitrobenzene,
1-amino-2-chloro-6-methylsulfonyl-4-nitrobenzene,
1-amino-2-aminosulfonyl-4-nitrobenzene,
1-amino-4-aminosulfonyl-2-nitrobenzene, 1-amino-2-methylaminosulfonyl-4-nitrobenzene, 1-amino-2-dimethylaminosulfonyl-4-nitrobenzene, 1-amino-2-diethylaminosulfonyl-4-nitrobenzene, amino-4-dimethylaminosulfonyl-2-nitrobenzene,
1-amino-2-aminocarbonyl-4-nitrobenzene,
1-amino-5-aminocarbonyl-2-nitrobenzene,
1-amino-4-aminocarbonyl-2-nitrobenzene,
1-amino-2-methylaminocarbonyl-4-nitrobenzene,
1-amino-2-dimethylaminocarbonyl-4-nitrobenzene,
1-amino-2-diethylaminocarbonyl-4-nitrobenzene,
1-amino-2-ethylaminocarbonyl-4-nitrobenzene,
1-amino-4-methylaminocarbonyl-2-nitrobenzene,
1-amino-4-ethylaminocarbonyl-2-nitrobenzene,
1-amino-4-dimethylaminocarbonyl-2-nitrobenzene,
1-amino-4-diethylaminocarbonyl-2-nitrobenzene,
1-amino-2-bromo-6-chloro-4-nitrobenzene, 1-amino-2-bromo-4-chloro-6-nitrobenzene, 1-amino-2-bromo-4-chloro-5-nitrobenzene,
1-amino-4-bromo-2-chloro-5-nitrobenzene,
1-amino-2-methoxy-4-nitrobenzene,
1-amino-2,5-dimethoxy-5-nitrobenzene,
1-amino-2-methoxy-6-nitrobenzene,
1-amino-2-methoxy-5-nitrobenzene,
1-amino-2-methoxy-3-nitrobenzene,
1-amino-3-methoxy-2-nitrobenzene,
1-amino-4-methoxy-2-nitrobenzene,
1-amino-5-methoxy-2-nitrobenzene,
1-amino-3-methoxy-5-nitrobenzene,
1-amino-3-methoxy-4-nitrobenzene,
1-amino-4-methoxy-3-nitrobenzene,
1-amino-2-bromo-4-nitro-6-methylbenzene,
1-amino-2-chloro-5-methoxy-4-nitrobenzene,
1-amino-2-ethyloxethyloxycarbonyl-4-nitrobenzene.

The coupling components of Formula III belong to the 3-methylpyrazolone-5-series. Examples of substituents of the benzene nucleus in the 1 position of the pyrazolone are acylamino groups, in particular low molecular alkylsulfonylamino groups and low molecular alkylcarbonylamino groups, whose alkyl radical may be substituted by hydroxyl, cyano, trifluoromethyl, alkoxy, aryloxy, amino, monoalkylamino, dialkylamino, aryl, a carboxylic acid ester radical or a carboxylic acid amide radical, which latter may be monoalkylated or dialkylated. Alkoxy, aryloxy, aryl, the carboxylic acid ester radical, the alkylated carboxylic acid amide radical and the monoalkylated or dialkylated amino group may be substituted by halogen, nitro, cyano or low molecular alkyl. Also suitable are arylcarbonylamino groups, in particular phenylcarbonylamino groups whose benzene nucleus may be substituted, for example by halogen, nitro, cyano, low molecular alkyl or low molecular alkoxy; the formylamino group, alkoxycarbonylamino or aryloxycarbonylamino groups which may be further substituted. Besides the aforenamed substituents the benzene nucleus in the 1 position of the 5-pyrazolone may contain, for example, halogen, cyano, low molecular alkyl or low molecular alkoxy groups. Examples of coupling components of Formula III are 1-(4'-methylsulfonyl-aminophenyl)-3-methyl-5-pyrazolone,
1-(2'-ethylsulfonylamino-4'-chlorophenyl)-3-meyth-5-pyrazolone,
1-[3'-(2''-chloroethoxy)-carbonylaminophenyl]-3-methyl-5-pyrazolone,
1-[3'-(2''-hydroxyethoxy)-carbonylaminophenyl]-3-methyl-5-pyrazolone,
1-[2'-(2''-cyanoethyl)-carbonylaminophenyl]-3-methyl-5-pyrazolone,
1-(4'-benzoylaminophenyl)-3-methyl-5-pyrazolone,
1-(4'-tert.-butylcarbonylaminophenyl)-3-methyl-5-pyrazolone,
1-(3'-dimethylaminocarbonylamino-4'-chlorophenyl)-3-methyl-5-pyrazolone,
1-(4'-β-trifluoromethylpropylcarbonylaminophenyl)-3-methyl-5-pyrazolone,
1-(3'-dimethylaminoethylcarbonylaminophenyl)-3-methyl-5-pyrazolone,
1-(4-[4''-methoxyphenoxy]-methylcarbonylaminophenyl)-3-methyl-5-pyrazolone,
1-[4'-(2''-aminocarbonyl)-ethyl-carbonylaminophenyl]-3-methyl-5-pyrazolone,
1-[4'-(2''-methoxy-carbonyl)-ethylcarbonylaminophenyl]-3-methyl-5-pyrazolone,
1-[4'(4''-chlorophenyl)-sulfonylamino-phenyl]-3-methyl-5-pyrazolone.

The coupling reaction of the diazo compounds of the amines which are diazotizible only in concentrated sulfuric or phosphoric acid with the coupling components of Formula III is carried out preferably in aqueous organic medium at a strongly to weakly acid reaction and at temperatures of −10 to +10° C., for example at 0–5° C.

The aqueous organic medium can be a mixture of water and low molecular alcohols (methanol, ethanol, n-propanol, isopropanol) or ketones (acetone, methylethyl ketone) or ethers (dioxan, 2-methoxy- or 2-ethoxyethanol) or acids (100% acetic acid, a mixture of acetic and propionic acids). A convenient mode of operation of the process is to dissolve the coupling component in an organic solvent with the addition if necessary of an acid binding agent, to which solution is added the diazo solution and, simultaneously or subsequently, an acid binding agent in powder form or in concentrated aqueous solution.

If the dye formed does not separate by itself from the reaction mixture, it is isolated by one of the normal basic operations, for example by evaporation of the solvent, elimination of the solvent with for example water vapor, or by precipitation from the solvent with a suitable medium, after which the dye is filtered off.

The amines of Formula II are diazotized in the usual way, that is to say in mineral acid solution or suspension at temperatures of 0° to 20° C., or preferably at 0–10° C. The amines of Formula II which belong to the benzene series, for example, dinitro- and dihalogenonitroaminobenzenes, are of such low basicity that they are insoluble in aqueous acids and these are diazotized preferably in a concentrated mineral acid, for example in 80 to 100% sulphuric acid or in 80 to 90% phosphoric acid, at 0 to 20° C., or preferably at 0 to 10° C. A preferred diazotizing method is to add the finely pulverized amine into a freshly prepared nitrosylsulfuric acid at 0–5° C. After diazotization it is best to dilute the solution with ice and water to a content of 5 to about 15% sulphuric acid and to destroy any small excess of nitrous acid by means of aminosulfonic acid or urea.

Coupling of the diazotized amines with the coupling components of Formula III is carried out preferably in aqueous or aqueous organic medium at a weakly acid, neutral or weakly alkaline reaction, for example in the pH range of 3.5 (acetate buffer) to 9.5 (carbonate/bicarbonate buffer) and at temperatures of 0° to about 30° C., or preferably at 0–10° C., when the amine used belongs to the benzene series and is sufficiently soluble in the form of the chloride.

It is especially advantageous to convert the new dyes thus obtained into dyeing preparations in the known way before they are used. For this purpose they are comminuted until the average particle size is about 0.01 to 10 microns or more particularly 0.1 to 5 microns. Comminution can be effected in the presence of dispersants and/or fillers. For example, the dried dye can be ground with a dispersant and if necessary fillers or it can be kneaded in paste form with a dispersant and then vacuum or jet dried. These preparations can be used for the dyeing, padding or printing of all synthetic and semi-synthetic hydrophobic organic fibers and textiles made of these fibers, for example yarns, nonwoven and woven fabrics and knitted goods. They can also be used for the mass coloration of synthetic materials and synthetic resins and their solutions. By synthetic materials are understood plastic materials in the mass, synthetic resins and solutions of these materials. Very good results are obtained in the dyeing of linear aromatic polyesters, for example those of terephthalic acid and ethylene glycol (polyethylene terephthalate) and cellulose diacetate and cellulose triacetate. Synthetic polyamides, for example the polycondensates or polymers of adipic acid and hexamethylene diamine, ω-aminoundecanoic acid or ε-caprolactam, as well as acrylonitrile polymers can be dyed from aqueous dispersion at long or short liquor ratios, and padded or printed. The assistants commonly used in these operations are beneficial; thus wetting, emulsifying, dispersing and thickening agents and the generally used carriers can be employed.

The dyeings and prints obtained are generally fixed on the fiber by heat treatment, either in the dyebath or subsequently to application of dye by a treatment in dry or wet heat. For the latter purpose temperatures of about 100 to 140° C. in the presence of water vapor are required, or 150 to 235° C. in the absence of water vapor.

The dyeings obtained have very good fastness properties, for example good fastness to light, wet treatments, especially washing, steaming, water, bath water, sea water, dry-cleaning, perspiration, and to rubbing, chlorine, peroxide, hypochlorite, cross-dyeing and gas fumes, and outstanding fastness to pleating, sublimation and thermofixation.

In the following examples the parts and percentages are by weight and the temperatures are in degrees centigrade.

Example 1

A mixture of 60 parts of water, 40 parts of concentrated hydrochloric acid and 17.2 parts of 1-amino-2-chloro-4-nitrobenzene is stirred for 3 hours at room temperature, then cooled by the addition of 100 parts of ice and diazotized in 2 hours at 0–5° with a solution of 6.9 parts of sodium nitrite in 30 parts of water. Stirring is continued for 15 minutes beyond this time, then 10 parts of aminosulfonic acid are added to the solution. The clear diazonium salt solution is filtered off and added dropwise in 15 minutes to an ice-cold solution of 26.7 parts of 3-methyl-1-(4'-methyl-sulphonylaminophenyl) - 5 - pyrazolone in 1500 parts of water and 30 parts of sodium hydroxide. Stirring is continued for 15 minutes, after which 60 parts of concentrated hydrochloric acid are dropped in. The dye is then filtered off, washed with water and dried. After recrystallization from a mixture of 1 part of alcohol and 9 parts of dioxan the dye melts at 276°. It dyes polyester fibers in yellow shades having outstanding fastness properties.

Example 2

13.8 parts of p-nitroaniline are diazotized by the normal method. After the excess sodium nitrite has been decomposed, the diazonium salt solution is filtered and coupled with an acetic acid solution, adjusted to 0–5° C., of 26.1 parts of 3 - methyl - 1 (4'-ethoxycarbonylaminophenyl) -5-pyrazolone in 500 parts of water. The mixture is stirred overnight and the dye is subsequently filtered off, washed with water and dried. On recrystallization from dimethyl formamide it melts at 170–173° C. It dyes polyester fibers in yellow shades which have outstandingly good fastness properties.

Example 3

17.2 parts of 1-amino-2-chloro-4-nitrobenzene are diazotized and filtered as described in Example 1. The clear diazoninum salt solution is run in 15 minutes into an ice-cold solution of 23.1 parts of 3-methyl-1-(4'-acetyl-aminophenyl)-5-pyrazolone in 500 parts of water. After being buffered to pH 3 with about 10 grams of sodium acetate, the solution is stirred overnight. On the following morning the dye thus obtained is filtered off, washed with water and dried. On recrystallization from glacial acetic acid it is obtained in the pure state. Its melting point is 260–265° C. It dyes polyester fibers in yellow shades with outstanding fastness properties.

*Procedure for the thermosol dyeing process.*—A thickened liquor containing 5 parts of the finely dispersed dye of Example 1 and 2 parts of sodium alginate per 100 parts of water is padded on a blend fabric of cotton and polyester fiber. The padded fabric is dried, treated for 30 seconds to 2 minutes at 150–230°, washed off and cleared of excess unfixed dye by treatment in a blind vat.

*Procedure for the spin dyeing of viscose rayon filament.*—10 parts of the dye obtained according to Example 1 are ground with 10 parts of sodium dinaphthylmethane disulphonate and 80 parts of water in a ball mill until the average particle size of the pigment is 1 micron. 100 parts of this paste are stirred with 22,500 parts of an aqueous viscose solution of approximately 9% strength with mechanical agitation. After continued stirring for 15 minutes the mass is de-aerated and the viscose filament is spun and desulfurized in the normal way. The yellow spun-dyed filament obtained is fast to light and wet treatments.

*Procedure for the spin dyeing of cellulose diacetate.*—A mixture of 100 parts of cellulose diacetate, 400 parts of acetone and 1 part of the dye obtained according to Example 1 is ground in a ball mill until essentially no particles larger than 1 micron are present. The mass is dry spun by the normal method. The resulting filament is light and wet fast.

In the following table are listed the substituents of further dyes conforming to the present invention which have the formula

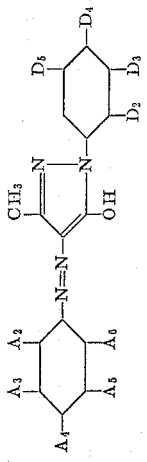

All these dyes exhibit a yellow shade on polyethylene terephthalate.

| Example No. | $A_2$ | $A_3$ | $A_4$ | $A_5$ | $A_6$ | $D_2$ | $D_3$ | $D_4$ | $D_5$ |
|---|---|---|---|---|---|---|---|---|---|
| 4 | Cl | H | $NO_2$ | H | H | H | $NHSO_2CH_3$ | H | H |
| 5 | $NO_2$ | H | Cl | H | H | H | $NHSO_2CH_3$ | H | H |
| 6 | Cl | H | $NO_2$ | H | Cl | H | $NHSO_2CH_3$ | H | H |
| 7 | Br | H | $NO_2$ | H | H | $CH_3$ | $NHSO_2CH_2CH_3$ | H | H |
| 8 | $CH_3$ | H | $NO_2$ | H | H | H | H | $NHSO_2CH_3$ | $NHSO_2CH_3$ |
| 9 | H | H | $NO_2$ | H | H | H | H | $NHSO_2CH_3$ | H |
| 10 | Cl | H | $NO_2$ | H | Cl | H | $CH_3$ | $NHSO_2CH_3$ | H |
| 11 | H | H | $NO_2$ | H | Cl | H | H | $NHSO_2CH_3$ | H |
| 12 | Cl | H | $NO_2$ | H | Cl | H | H | $NHSO_2CH_3$ | H |
| 13 | H | $NO_2$ | H | H | H | H | $NHSO_2CH_3$ | $NHSO_2CH_3$ | H |
| 14 | H | $NO_2$ | H | H | H | H | $NHSO_2CH_3$ | $NHSO_2CH_3$ | H |
| 15 | $NO_2$ | H | H | H | H | H | $NHCOCH_3$ | $NHSO_2CH_3$ | H |
| 16 | $NO_2$ | H | H | H | H | H | $NHCOCH_3$ | $NHCOCH_3$ | H |
| 17 | H | $NO_2$ | H | H | H | H | $NHCOCH_3$ | $NHCOCH_3$ | H |
| 18 | $NO_2$ | H | H | H | H | H | $NHCOCH_3$ | $NHCOCH_3$ | H |
| 19 | Cl | H | $NO_2$ | H | H | H | $NHCOCH_3$ | $NHCOCH_3$ | H |
| 20 | $NO_2$ | H | H | H | H | H | $NHCOCH_3$ | $NHCOCH_3$ | H |
| 21 | Cl | H | $NO_2$ | H | H | H | $NHCOCH_3$ | $NHCOCH_3$ | H |
| 22 | $NO_2$ | H | H | H | H | H | $NHCOOCH_2C_6H_5$ | $NHCOCH_3$ | H |
| 23 | H | H | H | H | H | Cl | H | H | H |
| 24 | Cl | H | Cl | H | H | Cl | $NHCOOCH_2CH_3$ | $NHCOOCH_2CH_3$ | H |
| 25 | $NO_2$ | H | Cl | H | H | H | $NHCOOCH_2CH_3$ | $NHCOOCH_2CH_3$ | H |
| 26 | $CH_3$ | H | Cl | Cl | H | H | $NHCOOCH_2CH_3$ | $NHCOOCH_2CH_3$ | H |
| 27 | $NO_2$ | H | $NO_2$ | H | H | H | $NHCOOC_2H_5$ | H | H |
| 28 | $NO_2$ | H | H | H | H | H | $NHCOOC_2H_5$ | H | H |
| 29 | $NO_2$ | $NO_2$ | $CH_3$ | H | H | H | $NHCOOC_2H_5$ | Cl | H |
| 30 | H | H | $CH_3$ | H | H | Cl | $NHCOOC_2H_5$ | H | $CH_3$ |
| 31 | $CH_3$ | $NO_2$ | $CH_3$ | H | H | H | $NHCOOC_2H_5$ | H | $NHCOOC_2H_5$ |
| 32 | $NO_2$ | H | H | H | H | Cl | $NHSO_2C_6H_5$ | H | H |
| 33 | $CH_3$ | H | $NO_2$ | H | $CH_3$ | H | $NHSO_2$-⟨C_6H_4⟩-$CH_3$ | H | H' |

| Example No. | $A_2$ | $A_3$ | $A_4$ | $A_5$ | $A_6$ | $D_2$ | $D_3$ | $D_4$ | $D_5$ |
|---|---|---|---|---|---|---|---|---|---|
| 34 | $CF_3$ | H | $NO_2$ | H | H | H | NHSO₂–C₆H₄–Cl (para) | H | H |
| 35 | $SO_2CH_3$ | H | $NO_2$ | H | H | H | NHSO₂–C₆H₄–Cl | H | H |
| 36 | $NO_2$ | H | $SO_2CH_3$ | H | H | H | NHSO₂–C₆H₄–Cl | H | H |
| 37 | H | $NO_2$ | H | H | H | Cl | H | NHSO₂–C₆H₄–CH₃ | H |
| 38 | $NO_2$ | H | H | $NO_2$ | H | $CH_3$ | $CH_3$ | H | $NHSO_2C_6H_5$ |
| 39 | $CH_3$ | H | $CH_3$ | H | H | CN | H | $NHSO_2CH_3$ | H |
| 40 | $NO_2$ | H | Cl | H | H | $CH_3$ | H | $NHSO_2CH_3$ | H |
| 41 | $CF_3$ | H | $NO_2$ | H | Br | $COOC_2H_5$ | H | $NHCOOCH_3$ | H |
| 42 | $SO_2CH_3$ | H | $NO_2$ | H | Cl | Br | H | $NHSO_2CH_3$ | H |
| 43 | $SO_2NH_2$ | H | $NO_2$ | H | H | CN | H | $NHSO_2CH_3$ | H |
| 44 | $SO_2N(CH_3)_2$ | H | $CONH_2$ | H | H | Cl | H | $NHSO_2CH_3$ | $CH_3$ |
| 45 | $NO_2$ | H | $NO_2$ | H | H | Cl | $NHSO_2CH_3$ | $NHSO_2CH_3$ | H |
| 46 | $NO_2$ | H | $CON(CH_3)_2$ | H | H | H | $NHSO_2C_2H_5$ | H | H |
| 47 | $CH_3$ | H | H | H | H | H | $NHCHO$ | H | $NHSO_2CH_3$ |
| 48 | $NO_2$ | H | H | $NO_2$ | H | H | $NHCOCH_2CN$ | H | H |
| 49 | $OCH_3$ | H | H | H | H | H | $NHCOCH_2OC_2H_5$ | H | H |
| 50 | $NO_2$ | H | $CH_3$ | H | H | H | $NHCOCH_2CN$ | H | H |
| 51 | $NO_2$ | H | H | H | H | Cl | $NHCOCF_3$ | H | H |
| 52 | $NO_2$ | H | Cl | H | H | $CH_3$ | $NHCOCH_2OH$ | H | H |
| 53 | $NO_2$ | H | $CH_3$ | H | H | Cl | $NHCOC_6H_5$ | H | H |
| 54 | H | H | $NO_2$ | H | H | $NO_2$ | | H | H |
| 55 | $CH_3$ | H | $NO_2$ | H | H | H | NHCO–C₆H₄–NO₂ | H | H |
| 56 | Cl | H | $NO_2$ | H | H | H | NHCO–C₆H₄–CH₃ | H | H |
| 57 | Br | H | $NO_2$ | H | H | H | NHCO–C₆H₄–Cl | H | H |
| 58 | $OCH_3$ | H | $NO_2$ | H | H | H | $NHCOCH_2OC_6H_5$ | H | H |
| 59 | Cl | H | $NO_2$ | $OCH_3$ | H | H | $NHCOCH_2NH_2$ | H | H |
| 60 | $OCH_3$ | H | $NO_2$ | H | H | H | $NHCOCH_2C_6H_5$ | H | H |
| 61 | $NO_2$ | H | $CH_3$ | H | H | H | $NHCOCH_2OC_6H_5$ | H | H |
| 62 | Cl | H | $NO_2$ | H | $CH_3$ | H | NHCOCH₂O–C₆H₄–CH₃ | H | H |
| 63 | H | $CH_3$ | $NO_2$ | H | $NO_2$ | H | $NHCOCH_2COOCH_3$ | H | H |
| 64 | H | Cl | $NO_2$ | H | H | H | $NHCOCH_2CONH_2$ | H | H |
| 65 | Cl | H | H | $NO_2$ | H | H | $NHCOCH_2N(CH_3)_2$ | H | H |
| 66 | Cl | H | H | Cl | H | H | $NHCOCH_2NHCOCH_3$ | H | H |
| 67 | Cl | $NO_2$ | H | Cl | H | H | NHCOCH₂–C₆H₄–Cl | H | H |

| Example No. | $A_2$ | $A_3$ | $A_4$ | $A_5$ | $A_6$ | $D_2$ | $D_3$ | $D_4$ | $D_5$ |
|---|---|---|---|---|---|---|---|---|---|
| 68 | CH₃ | H | CH₃ | NO₂ | H | NHCOCH₂COOCH₂CH₂OCH₃ | H | H | |
| 69 | H | NO₂ | H | H | H | NHCOOCH₂CH(CH₃)₂ | H | NHCOOCH₂CH₂Cl | H |
| 70 | H | H | NO₂ | NO₂ | H | H | H | H | H |
| 71 | CH₃ | H | NO₂ | H | H | NHCOC₂H₄CHCH₃ OCH₃ | H | OCH₃ | H |
| 72 | CH₃ | H | NO₂ | H | H | NHCOOCH₂CH₂CH₃ | H | NHCOOCH₂CH₂CH₃ | H |
| 73 | H | NO₂ | CH₃ | H | H | NHCOOCH₂CHCH₃ OCH₃ | H | OCH₃ | H |
| 74 | NO₂ | H | Cl | H | CH₃ | NHSO₂CH₃ | H | Cl | H |
| 75 | CH₃ | H | NO₂ | H | H | NHCO—⌬—OCH₃ | H | H | H |
| 76 | H | H | OCH₃ | NO₂ | H | NHCO—⌬—CN | H | H | H |
| 77 | H | NO₂ | H | CF₃ | H | NHCOC₆H₅ | H | H | H |
| 78 | H | NO₂ | NHCOCH₃ | H | H | NHCOO—⌬—CH₃ | H | NHCOCH₃ | H |

Formulae of representative dyes of the foregoing examples are as follows:

Example 1

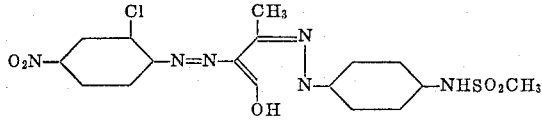

Example 17

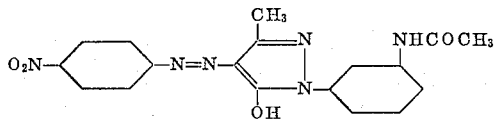

Example 22

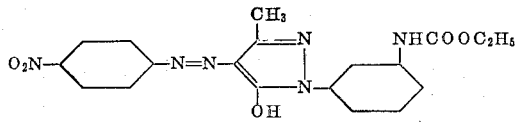

Having thus disclosed the invention what we claim is:
1. Metal-free azo dye of low water solubility which is free from sulfonic acid and carboxylic acid groups and is of the formula

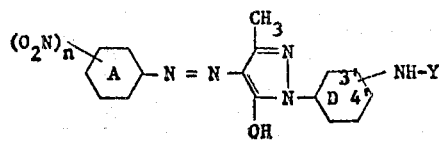

wherein
the substituent —NH—Y of the nucleus D is in the 3′- or the 4′-position;
Y is a member selected from the group consisting of —CO—$R_1$, —COO$R_2$ and —SO₂—$R_2$;
$R_1$ is a member selected from the group consisting of hydrogen, phenyl, alkylphenyl, cyanophenyl, alkoxyphenyl, chlorophenyl, nitrophenyl, trifluoromethyl, alkyl and alkyl substituted by a substituent selected from the group consisting of hydroxy, cyano, alkoxy, aminocarbonyl, alkoxycarbonyl, alkoxyalkoxycarbonyl, amino, dialkylamino, alkylcarbonylamino, phenyl, phenyloxy and phenalkoxy; each alkyl and the alkyl of each alkoxy being lower alkyl; and wherein each phenyl substituent is either unsubstituted or substituted by a member selected from the group consisting of methyl and chloro;
$R_2$ is a member selected from the group consisting of phenyl, methylphenyl, chlorophenyl, dichlorophenyl, lower alkyl, chloro(lower)alkyl and (lower)alkoxy-(lower)alkyl;
$n$ is one of the integers 1, 2 and 3; and
nucleus A may be further substituted by from 1 to 2 chlorine or bromine atoms, lower alkyl, fluoromethyl, lower alkoxy, ethoxyethoxycarbonyl, aminocarbonyl, lower alkylaminocarbonyl, lower alkylsulfonyl aminosulfonyl and lower alkylaminosulfonyl.

2. An azo dye according to claim 1 wherein $n$ is 1 and the nitro group of nucelus A is in para-position.

3. The azo dye of the formula

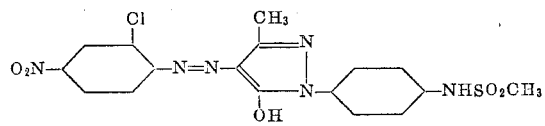

4. The azo dye of the formula

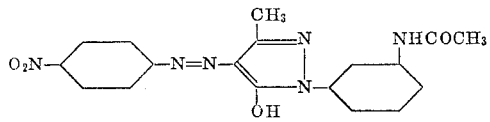

5. The azo dye of the formula

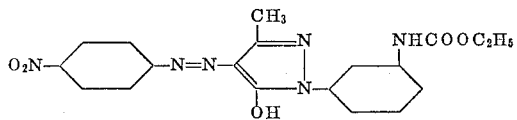

References Cited
UNITED STATES PATENTS

| | | | |
|---|---|---|---|
| 2,151,518 | 3/1939 | Krzikalla et al. | 260—163 |
| 2,814,615 | 11/1957 | Zickendraht | 260—163 X |
| 3,206,453 | 9/1965 | Merian et al. | 260—163 |

CHARLES B. PARKER, *Primary Examiner.*

D. M. PAPUGA, *Assistant Examiner.*